G. B. KOHLER.
CAR SEAT.
APPLICATION FILED JULY 1, 1915.
1,221,748.
Patented Apr. 3, 1917.
2 SHEETS—SHEET 1.
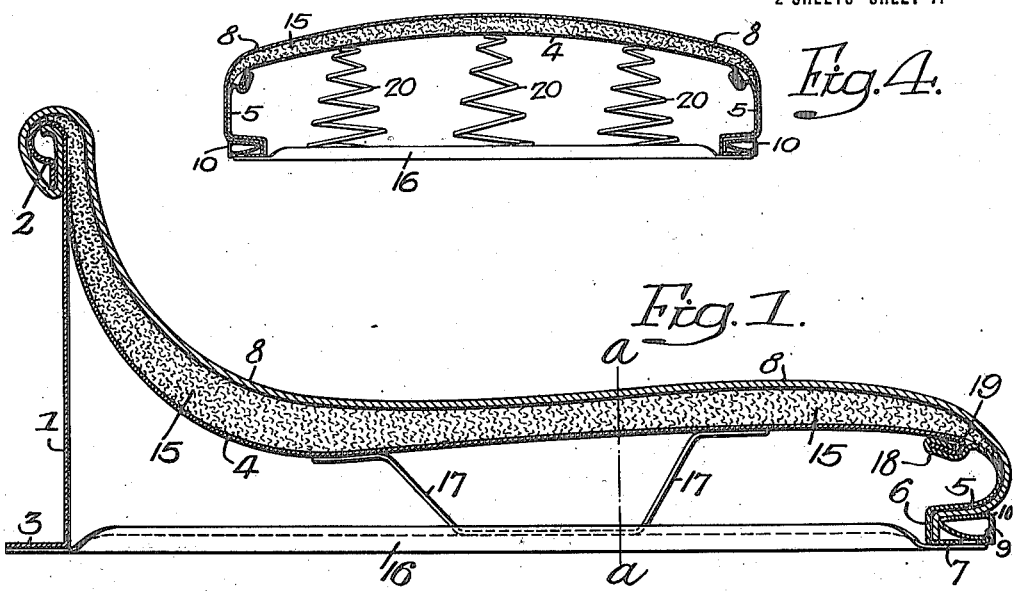
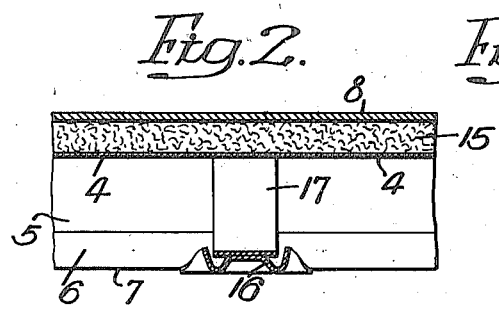
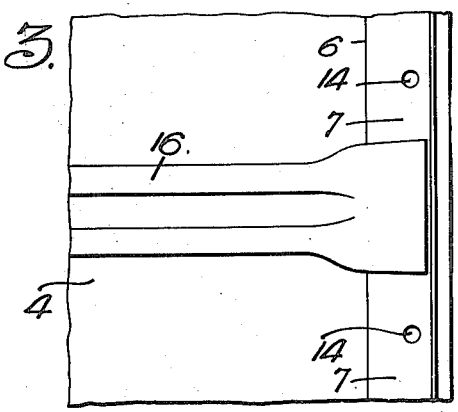
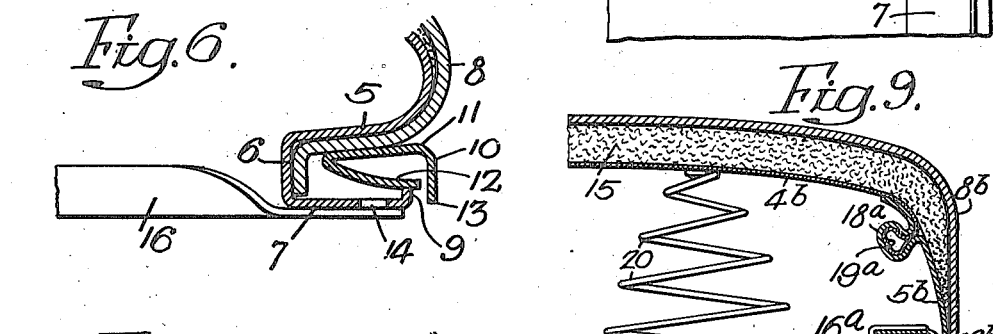
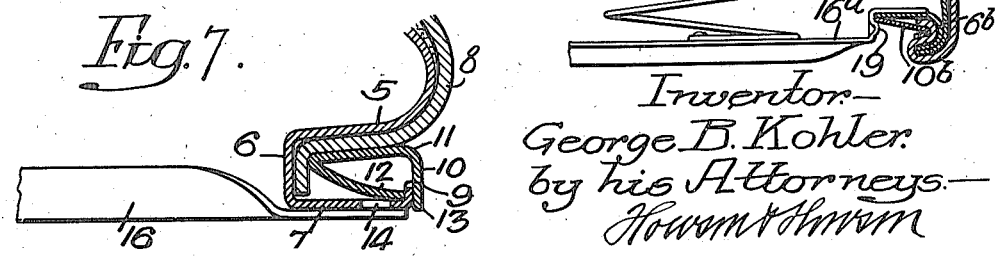
Inventor—
George B. Kohler.
by his Attorneys G. B. KOHLER.
CAR SEAT.
APPLICATION FILED JULY 1, 1915.
1,221,748.
Patented Apr. 3, 1917.
2 SHEETS—SHEET 2.
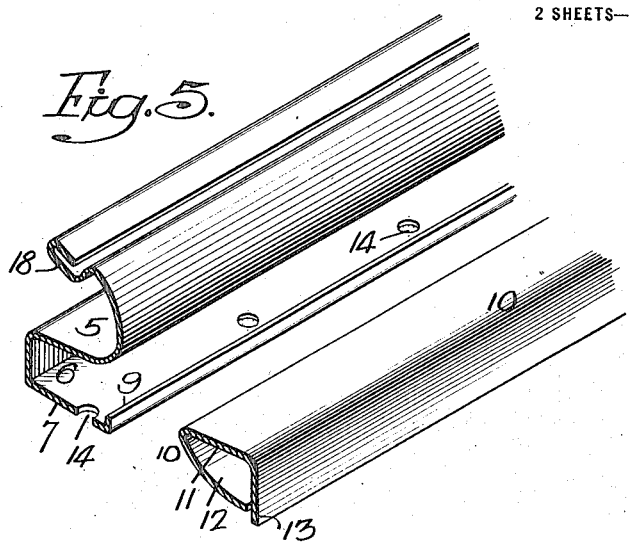
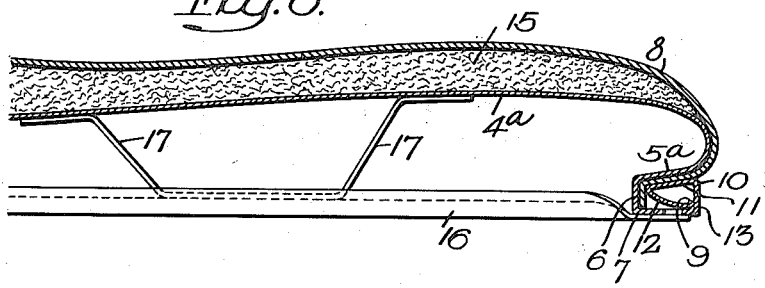
Inventor.—
George B. Kohler.
by his Attorneys.—

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-SEAT.

1,221,748.  Specification of Letters Patent.  Patented Apr. 3, 1917.

Application filed July 1, 1915. Serial No. 37,509.

*To all whom it may concern:*

Be it known that I, GEORGE B. KOHLER, a citizen of the United States, residing in Philadelphia, Pennsylvania, have invented certain Improvements in Car-Seats, of which the following is a specification.

My invention relates to certain improvements in car seats of the type having a metallic frame and in which the covering of ratan, or other material, is secured to the frame.

One object of the invention is to improve the construction of a car seat of this type so that the covering will be firmly held in position.

A further object of the invention is to provide a fastening device, which can be forced into position and clamped to the frame and which can be removed when it is necessary to repair or recover the seat.

The invention is particularly adapted for longitudinal car seats, but it can be applied to transverse seats without departing from the essential features of the invention and can also be used for the seats of railway stations, and other public places, where the covering is subjected to excessive wear.

In the accompanying drawings:—

Figure 1, is a transverse sectional view of one form of car seat illustrating my invention;

Fig. 2, is a sectional view on the line a—a, Fig. 1;

Fig. 3, is an inverted plan view of the front portion of the car seat illustrated in Fig. 1;

Fig. 4, is a sectional view of a car seat in which the clamp mechanism is shown at each side of the frame structure;

Fig. 5, is a perspective view of a portion of the frame and the retaining bar;

Fig. 6, is an enlarged sectional view showing the retaining bar partly in position.

Fig. 7, is a view similar to Fig. 6, showing the bar is position engaging the frame and holding the covering material in place; and Figs. 8 and 9 are sectional views illustrating modifications of the invention.

In Fig. 1, I have illustrated my invention as applied to a seat, which is usually arranged longitudinally on each side of a car; while in Fig. 4, I have illustrated a transverse seat of the type used with, or without, a movable back.

Referring in the first instance to Figs. 1 to 3, inclusive, 1 is a metallic back frame shaped as shown in Fig. 1 and having a rolled upper end 2 and a base flange 3. 5 is a front frame made of a metallic plate bent to form a channel 6 extending the full length of the front frame. The bottom flange 7 of the front frame extends outwardly and has an upturned lip 9 forming a lock for the retaining bar or strip 10, which is shaped as clearly shown in Fig. 5. The front frame 5 is connected to the back frame 1 by a series of cross bars 16, welded to the flanges 3 and 7 of the seat frames. These cross bars are in the form of channels and are shaped as clearly shown in Fig. 2.

4 is a seat plate in the present instance, which is welded at its upper end to the back frame 1 and is coupled to the front frame by a detachable joint formed by bending the upper flange of the front frame to form a hook 18, and bending the outer edge of the seat plate to form a hook 19 so that, when these two hook sections are in engagement, the plate 4 is held firmly to the front frame 5, as clearly shown in Fig. 1.

In some instances, the front frame and the seat plate may be formed of a single piece, as shown clearly in Fig. 8, in which $5^a$ is the front portion of the structure and $4^a$ is the bottom section of the plate. The retaining bar 10 has a horizontal body portion 11, a spring section 12, extending under the body portion, and a vertical portion 13, which forms a covering for the joint and a finish to the edge of the car seat. The spring section 12 terminates short of the vertical portion 13 so that, when this retaining bar is forced into the recess 6, the spring section will yield and will spring back of the lip 9 at the outer edge of the flange 7 so that, as the covering material 8 is mounted on the car seat structure with the edge extending into the recess 6, the retaining bar, when forced into position, as illustrated in Figs. 6 and 7, will hold the covering 8 firmly to the frame.

Cushion material 15 may be mounted between the plate and the covering material 8 and may be of any thickness desired. The covering material, in the present instance, is ratan, which is exceedingly difficult to retain in position.

By making the seat structure in the manner shown in Fig. 1, for instance, where the back plate is rolled at the upper end to form a cavity and has a depending flange forming a narrow opening into the cavity, the edge of the ratan covering material can be pushed vertically through the narrow opening into the cavity as far as possible, as illustrated in Fig. 1, and then the covering can be turned over the edge of the seat structure and the outer edge can be fastened to the front edge of the seat frame by the bar 10. This construction holds the ratan covering firmly in place and is an easy method of applying the covering.

When a seat of the type illustrated in Fig. 4 is covered, I prefer to groove each side of the frame, as shown in the drawings, and to use a retaining bar at each side, firmly holding the ends of the seat covering to the frame, and the ends of the seat structure may also be grooved and the ends of the covering may be inserted and held therein by the retaining bars.

These seat frames are usually made for double seats arranged transversely of the car and are made detachable so that the entire cushion structure can be removed from the seat frame.

In order to remove the retaining bar 10 from the recess 6, I provide the lower flange 7 with a series of openings 14 through which a tool can be inserted to force the spring section 12 of the retaining bar clear of the lip 9, after which the bar can be removed.

In Fig. 9, I have illustrated another modification, in which the recess 6ᵇ of the frame 5ᵇ is at the rear of the frame and the retaining plate 10ᵇ holds the covering 8ᵇ in the recess as it bears against the upturned portion of the cross bar 16ᵃ, and projections 19, arranged at intervals on this portion of the cross bar, act to hold the plate 10ᵇ in position; the plate being inserted first in the recess and then forced back of the projections 19. By this construction the entire frame is covered by the covering material 8ᵇ.

In Fig. 9, I have also illustrated a modification of the hooked joint between the front frame 5ᵇ and the seat plate 4ᵇ; the upper flange of the front frame 5ᵇ being bent as shown at 18ᵃ, and the plate 4ᵇ being bent to form a tubular rib 19ᵃ which is inserted in the socket 18ᵃ from one end, making a substantial joint which will hold the seat frame rigidly to the front frame. The seat plate 4 can be supported from either end, or braces 17 can be located between the seat plate and the cross braces 16, if found desirable, and in the types of seats shown in Fig. 4, for instance, springs 20 can be located in the ordinary manner between the seat plate and the brace 16.

The modification of the retaining means and the joint can be used in connection with the type of seat illustrated in Fig. 1, or that shown in Fig. 4, without departing from the essential features of the invention.

I have shown the cross bars 16 secured to the rear frame and to the front frame by welding, but it will be understood that rivets, or other fastenings, may be used without departing from the spirit of the invention. I have also shown the angle braces 17 secured to the seat plate 4 and cross bar 16 by welding.

I claim:—

1. The combination in a seat structure, of a frame having a recess at one edge at or near the bottom of the seat structure, said frame being bent to form a lip at the outer edge of the recess; a cover extending over the seat frame and into the recess; and a retaining bar adapted to be forced into the recess and arranged to clamp the cover to the frame, said bar being held in position by the lip at the outer edge of the recess.

2. The combination in a seat structure, of a frame having a recess at one edge; a covering for the seat extending over the seat structure and into the recess, the lower flange of the frame, which forms the recess, having an upturned lip; a retaining bar having a right angled body portion; and a spring member, the spring member being arranged to spring back of the lip when the retaining bar is in the recess so as to hold the seat covering to the frame.

3. The combination in a seat structure, of a frame having a longitudinal recess at its lower edge, the lower flange of the frame forming the recess being upturned at its outer edge to form a lip and perforated at intervals; a seat cover adapted to the recess; and a retaining bar having a spring member engaging the lip when the bar is forced into the recess so as to hold the cover material to the frame, the bar being released by inserting a tool through the openings in the lower flange of the frame in order to force the spring member of the retaining bar out of engagement with the lip.

4. The combination in a seat structure, of a metallic frame having a recess at its lower edge to receive the edge of the fabric; means for holding the fabric in the recess and having an inturned upper flange forming a hook portion; a cushion-supporting plate having an end shaped to interlock with the hook portion of the flange of the said frame; and cushion material mounted between said plate and the fabric.

5. The combination in a seat structure, of a metallic frame having a longitudinal recess at its outer edge formed by bending the plate from which the frame is made and having a lip at the outer edge of the lower flange which forms the recess; a cover for the seat having its edge extending into the recess; a retaining bar having a right angled section and an inturned spring member arranged to be located in the recess between the cover material and the lip, a portion of the retaining bar extending over the lip; perforations in the bottom flange in line with the spring member of the retaining bar, so that a tool can be inserted in the openings to release the retaining bar; and means for retaining the opposite end of the cover in position on the frame.

GEORGE B. KOHLER.